United States Patent
Yoshino

(10) Patent No.: US 11,876,816 B2
(45) Date of Patent: Jan. 16, 2024

(54) ANOMALY MONITORING DEVICE

(71) Applicant: FANUC CORPORATION, Yamanashi (JP)

(72) Inventor: Kiyoshi Yoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 240 days.

(21) Appl. No.: 16/856,622

(22) Filed: Apr. 23, 2020

(65) Prior Publication Data
US 2020/0374307 A1 Nov. 26, 2020

(30) Foreign Application Priority Data
May 23, 2019 (JP) .................................. 2019-096594

(51) Int. Cl.
H04L 9/40 (2022.01)
B25J 13/00 (2006.01)

(52) U.S. Cl.
CPC .......... H04L 63/1425 (2013.01); B25J 13/00 (2013.01)

(58) Field of Classification Search
CPC .... H04L 63/1425; B25J 13/00; G06F 21/566; G06F 21/577; G06F 21/64; G06F 21/82; G06F 21/50
See application file for complete search history.

(56) References Cited

U.S. PATENT DOCUMENTS 10,580,407 B1* 3/2020 Sriram .................... G10L 15/30
10,802,982 B2* 10/2020 Atamlh ................. G06F 21/567
2013/0117867 A1* 5/2013 Fung ....................... G06F 21/88
  726/35
2013/0346145 A1* 12/2013 Sato ..................... H04M 15/60
  705/7.29
2016/0182539 A1* 6/2016 Edwards ................ G06F 21/44
  726/23

(Continued)

FOREIGN PATENT DOCUMENTS

JP     5590164       9/2014

OTHER PUBLICATIONS

Karali et al., "A target detection algorithm based on peripheral anomaly," 2011 IEEE 19th Signal Processing and Communications Applications Conference (SIU) Year: 2011 | Conference Paper | Publisher: IEEE.*

(Continued)

Primary Examiner — Roderick Tolentino
(74) Attorney, Agent, or Firm — Wenderoth, Lind & Ponack, L.L.P.

(57) ABSTRACT

To promptly investigate the cause of interruption of Ethernet communication. An anomaly monitoring device includes a power supply, an Ethernet port, an anomaly determination unit configured to determine whether or not an anomaly related to Ethernet communication has occurred between a peripheral device and a control device, an information collection unit configured to collect operation information about operation of the peripheral device when the anomaly determination unit determines that an anomaly related to the Ethernet communication has occurred, and an information transmission unit configured to transmit the collected operation information outside via the Ethernet port, on the basis of the Ethernet communication.

5 Claims, 3 Drawing Sheets

(56) References Cited

U.S. PATENT DOCUMENTS

| | | | |
|---|---|---|---|
| 2019/0354153 A1* | 11/2019 | Hauser | G06F 8/654 |
| 2020/0159181 A1* | 5/2020 | Kfir | H04L 63/1433 |
| 2020/0201300 A1* | 6/2020 | Baba | G05B 19/41835 |
| 2020/0226298 A1* | 7/2020 | Appleboum | G06F 21/85 |
| 2020/0342099 A1* | 10/2020 | Kerstein | G06F 21/554 |

OTHER PUBLICATIONS

Han et al., "Research on Network Traffic Anomaly Detection Based on Stream Characteristics in Unsaturated Link," 2019 IEEE 4th International Conference on Advanced Robotics and Mechatronics (ICARM) Year: 2019 | Conference Paper | Publisher: IEEE.*

* cited by examiner

ANOMALY MONITORING DEVICE

This application is based on and claims the benefit of priority from Japanese Patent Application No. 2019-096594, filed on 23 May 2019, the content of which is incorporated herein by reference.

BACKGROUND OF THE INVENTION

Field of the Invention

The present invention relates to an anomaly monitoring device.

Related Art

A robot system disposed in a factory or the like includes not only a robot control device and a robot body, but also a plurality of robot peripheral devices arranged in the vicinity of the robot, such as a teaching operation panel for teaching a program to the robot control device. It is noted that the robot peripheral device may further include a belt conveyor, a rail-type conveying carriage, or the like. In an example, the robot control device is connected to each of the plurality of robot peripheral devices by an Ethernet cable, via an Ethernet port of the robot control device, so as to exchange information such as an operation command based on a program, by Ethernet (registered trademark) communication. This realizes the advanced operation of a robot in conjunction with the operation of a plurality of robot peripheral devices.

In a known art, with respect to such advanced operation of a robot, in the case where the operation state of the robot or robot peripheral devices are monitored, and where the detected operation state deviates from a specified operation range or a specified speed, a robot stop signal or a peripheral device stop signal is output. For examples, Patent Document 1 should be referred to.

Patent Document 1: Japanese Patent No. 5590164

SUMMARY OF THE INVENTION

Ethernet communication may be interrupted unintendedly, in some cases. The interruption of the Ethernet communication herein means that no communication packet is able to be received from a communication partner for a certain period of time or longer. Causes of interruption of the Ethernet communication include (1) cases where the power supply of a communication partner device is turned off, (2) cases where the communication software of the communication partner hangs up (anomalous termination), and (3) cases of physical disconnection such as breakage of an Ethernet cable or the detachment of the Ethernet cable from an Ethernet port.

In cases where the Ethernet communication is interrupted, information exchange becomes impossible between the robot control device and the robot peripheral devices, and thereby the entire robot system including the robot control device and the robot peripheral devices may be brought into an operation stop state or an anomalous operation state, in some cases. In any of the above-described cases (1), (2) and (3), the robot control device does not receive any communication packets from a robot peripheral device. Therefore, it is difficult to identify what has caused the interruption of the communication, that is, identify the states of the robot peripheral devices.

In this case, in order to recover the robot system, an operator has to identify the cause of the interruption of the Ethernet communication, and to perform the recovery work corresponding to the cause. In some cases, depending on the installation location of the robot peripheral device, an operator may hardly approach the location. In such a case, investigation of the cause of the interruption of the Ethernet communication may require a great deal of time and effort.

Accordingly, art enabling the prompt investigation of the cause of the interruption of the Ethernet communication is desired.

An anomaly monitoring device in one aspect according to the present disclosure includes a power supply, an Ethernet port, an anomaly determination unit configured to determine whether or not an anomaly related to Ethernet communication has occurred between a peripheral device and a control device, an information collection unit configured to collect operation information about operation of the peripheral device when the anomaly determination unit determines that an anomaly related to the Ethernet communication has occurred, and an information transmission unit configured to transmit the collected operation information outside via the Ethernet port, on the basis of the Ethernet communication.

According to one aspect, the prompt investigation of the cause of the interruption in the Ethernet communication is enabled.

DETAILED DESCRIPTION OF THE INVENTION

One embodiment according to the present disclosure will be described below by use of the drawings.

Embodiment

Figure 1:
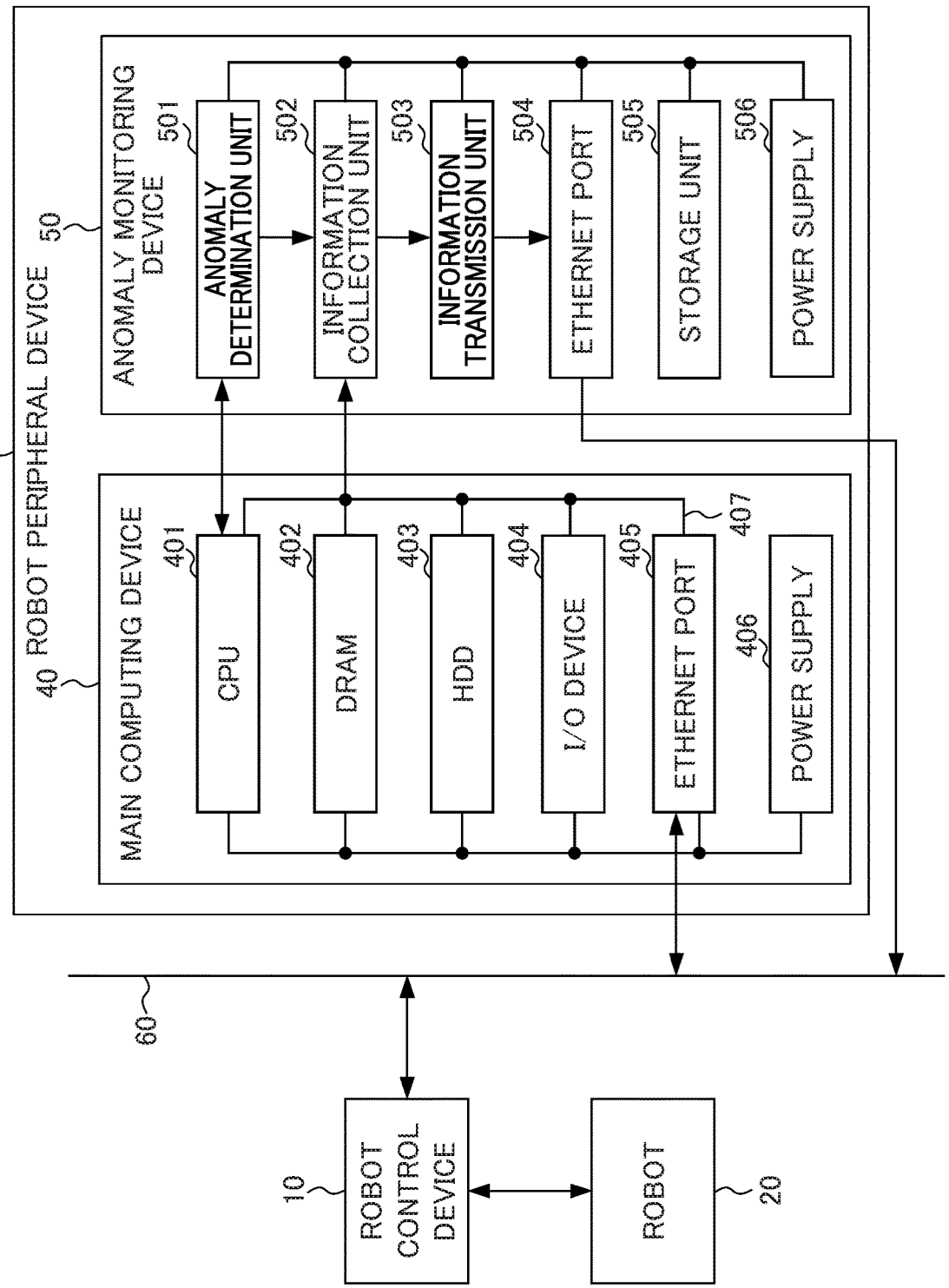
FIG. 1 is a functional block diagram illustrating an example of a functional configuration of a robot system according to one embodiment.

FIG. 1 is a functional block diagram illustrating an example of a functional configuration of a robot system according to one embodiment. As shown in FIG. 1, the robot system has a robot control device 10, a robot 20, and a robot peripheral device 30.

The robot control device 10 and the robot 20 may be directly connected to each other via a connection interface (not shown). It is noted that the robot control device 10 and the robot 20 may be connected to each other via a network 60 such as a LAN (local area network). In this case, each the robot control device 10 and the robot 20 may include a communication unit (not shown), configured to communicate with each other through the connection.

The robot control device 10 and the robot peripheral device 30 may be connected to each other via the network 60 by use of an Ethernet port (not shown) of the robot control device 10, and an Ethernet port 405 and an Ethernet port 504 of the robot peripheral device 30 to be described below.

It is noted that the robot control device 10 may be connected to a plurality (more than two) of the robot peripheral devices 30.

The robot control device 10 is a control device (also called a "robot controller") configured to control operation of the robot 20 and the robot peripheral device 30, by analyzing a program and outputting operation commands to the robot 20 and the robot peripheral device 30.

The robot control device 10 may acquire operation information indicating the operation states of the robot 20 and the robot peripheral device 30 in response to the operation commands, from the robot 20 and the robot peripheral device 30.

The robot 20 operates on the basis of the control by the robot control device 10. The robot 20 drives movable parts which are an arm and an end effector such as a hand, on the basis of the control by the robot control device 10. The robot 20 is realized as a general industrial robot used in a factory where, for example, automobiles or electronic components are manufactured.

The robot peripheral device 30 is, for example, a teaching operation panel configured to teach a program to the robot control device 10. In an example, as described above, the robot peripheral device 30 transmits, to the robot control device 10, the operation information indicating the operation state of the robot peripheral device 30. It is noted that the robot peripheral device 30 is not limited to such a teaching operation panel, but may be a belt conveyor or a rail-type conveying carriage, which is arranged in the vicinity of the robot 20 so as to receive an operation command from the robot control device 10 and operate in conjunction with the robot 20.

The robot peripheral device 30 includes an anomaly monitoring device 50 configured to monitor the Ethernet communication performed between the robot peripheral device 30 and the robot control device 10, as described below. In an example, the anomaly monitoring device 50 has the function of notifying, in the case of having detected an anomaly related to the above-described communication, the robot control device 10 of the detected anomaly contents related to the communication as operation information, by broadcast communication.

<Functional Blocks Included in Robot Peripheral Device 30>

The functional blocks included in the robot peripheral device 30 are described next.

As shown in FIG. 1, the robot, peripheral device 30 is configured with a main computing device 40 and the anomaly monitoring device 50.

The main computing device 40, which is, for example, computer apparatus, controls the operation of the robot peripheral device 30 on the basis of an operation command from the robot control device 10. The main computing device 40 has, for example, a CPU (central processing unit) 401, a DRAM (dynamic random access memory) 402 which is a volatile storage medium, an HDD (hard disk drive) 403 which is a non-volatile storage medium, an I/O (input/output) device 404, an Ethernet port 405, and a power supply 406. The CPU 401, the DRAM 402, the HDD 403, the I/O device 404, and the Ethernet port 405 are communicably connected via a bus 407.

The CPU 401 may execute various types of processing according to various types of programs loaded from the HDD 403 to the DRAM 402.

The DRAM 402 may store the data or the like required for the CPU 401 to execute various types of processing. It is noted that a volatile storage medium such as a RAM or a SRAM (static RAM) may be used in place of the DRAM 402.

The HDD 403 may store various types of programs or various types of data. The HDD 403 may store information about the Ethernet communication, such as the IP (internet protocol) address and the MAC (media access control) address assigned to the robot peripheral device 30 (main computing device 40), and the like. It is noted that a non-volatile storage medium such as a PROM (programmable read only memory) or an EPROM ((erasable PROM) may be used in place of the HDD 403.

The I/O device 404 may include, for example, an input device (not shown) such as a keyboard or a touch panel, and an output device (not shown) such as a liquid crystal display.

The insertion of an Ethernet cable (not shown) into the Ethernet port 405 allows the robot peripheral device 30 (main computing device 40) to perform the Ethernet communication with the robot control device 10 via the network 60.

The power supply 406 may be disposed in the main computing device 40, so as to supply electric power to the CPU 401, the DRAM 402, the HDD 403, the I/O device 404, and the Ethernet port 405.

As described above, the anomaly monitoring device 50 monitors the Ethernet communication performed between the robot control device 10 and the robot peripheral device 30 (main computing device 40), and notifies, when having detected an anomaly related to the Ethernet communication, the robot control device 10 of the operation information of the detected anomaly by broadcast communication. In order to realize the operation above, the anomaly monitoring device 50 has, for example, an anomaly determination unit 501, an information collection unit 502, an information transmission unit 503, the Ethernet port 504, a storage unit 505, and a power supply 506. That is, the anomaly monitoring device 50 functions as an Ethernet transceiver.

In an example, the anomaly determination unit 501 may determine whether or not an anomaly related to the Ethernet communication performed between the robot control device 10 and the robot peripheral device 30 (main computing device 40) has occurred.

More specifically, the anomaly determination unit 501 monitors the operation of the robot, peripheral device 30 (main computing device 40), for example, periodically at a predetermined time interval. The anomaly determination unit 501, when having detected that the power supply 406 of the main computing device 40 is in an off state, may determine that an anomaly related to the Ethernet communication corresponding to the above described case (1) has occurred. The anomaly determination unit 501, when having detected that communication processing in the various types of processing in the CPU 401 has been terminated anomalously (hang-up), may determine that an anomaly related to the Ethernet communication corresponding to the above described case (2) has occurred. The anomaly determination unit 501, when having detected that no communication packet, has been exchanged with the robot control device 10 through the Ethernet port 405 over a predetermined period of time, may determine that an anomaly related to the Ethernet communication according to the above described case (3) has occurred due to physical disconnection such as breakage of the Ethernet cable or the detachment of the Ethernet cable from the Ethernet port 405.

It is noted that such a predetermined time interval and such a predetermined period of time may be set as appropriate depending on the environment of the factory where the robot system is disposed, and/or the contents of an operation command to the robot 20 or the robot peripheral device 30.

The anomaly determination unit 501 is capable of reducing the load of the anomaly monitoring device 50, by, for example, monitoring the operation of the robot peripheral device 30 periodically at a predetermined time interval.

In cases where the anomaly determination unit 501 determines that an anomaly related to the Ethernet communication has occurred, the information collection unit 502 may collect the operation information about the operation of the robot peripheral device 30.

More specifically, in the case where an anomaly related to the Ethernet communication due to turning-off of the power supply 406 has occurred, the information collection unit 502 may collect the information indicating the power supply 46 is in an off state as operation information of the robot peripheral device 30.

In cases where an anomaly related to the Ethernet communication due to the anomalous termination (hang-up) of the communication processing in the CPU 401 has occurred, the information collection unit 502 may collect predetermined information as the operation information about the operation of the robot peripheral device 30. Examples of the predetermined information herein include the contents (for example, dump) output to a register of the CPU 401 of the main computing device 40, a volatile storage medium (DRAM 402), a non-volatile storage medium (HDD 403), and the I/O device 404.

In cases where an anomaly related to the Ethernet communication due to physical disconnection has occurred, such as breakage of the Ethernet cable or the detachment of the Ethernet cable from the Ethernet port 405, the information collection unit 502 may collect predetermined information as the operation information about the operation of the robot peripheral device 30, indicating that no communication packet has been exchanged over a predetermined period of time.

The information transmission unit 503 may transmit the operation information collected by the information collection unit 502 to the robot control device 10 via the Ethernet port 504, on the basis of the Ethernet communication.

More specifically, the information transmission unit 503 transmits the collected operation information to the robot control device 10, as described below, via the Ethernet port 504, by the broadcast communication using the MAC address of the robot peripheral device 30 (main computing device 40) stored in the storage unit 505.

In this case, in an example, the robot control device 10 may store in advance, in a storage unit (not shown), the MAC address of the robot peripheral device 30 (main computing device 40) to be controlled. The robot control device 10 may compare the MAC address of a transmission source included in the broadcast communication packet received via the Ethernet port (not shown) and the MAC address stored in the storage unit (not shown), to determine whether or not the transmission source is the robot peripheral device 30 (main computing device 40) to be controlled. This allows the robot control device 10 to acquire the operation information in the robot peripheral device 30, even if the Ethernet communication has been interrupted between the robot control device 10 and the main computing device 40 of the robot peripheral device 30. The robot control device 10 is able to identify, by analyzing the operation information, the cause of the interruption of the Ethernet communication, from among the causes of the turning-off of the power supply 406 of the main computing device 40, the anomalous termination (hang-up) of the communication processing, and physical disconnection such as breakage of the Ethernet cable or the detachment of the Ethernet cable from the Ethernet port 405.

The Ethernet port 504, when an Ethernet cable (not shown) is inserted therein, may be connected to the network 60. The connection allows the robot control device 10 to acquire the operation information of the main computing device 40 transmitted by the information transmission unit 503, via the network 60.

The storage unit 505, which is a non-volatile storage medium such as a ROM, may store information about the Ethernet communication such as the MAC address of the robot peripheral device 30 (main computing device 40).

The power supply 506 may be disposed in the anomaly monitoring device 50 so as to supply electric power to the anomaly determination unit 501, the information collection unit 502, the information transmission unit 503, the Ethernet port 504, and the storage unit 505. This allows the anomaly monitoring device 50 to, even if the power supply 406 configured to supply electric power to the main computing device 40 is turned off, reliably transmit the operation information about the operation of the robot peripheral device 30 (main computing device 40) to the robot control device 10.

<Anomaly Monitoring Processing of the Anomaly Monitoring Device 50>

The operation affected by the anomaly monitoring processing executed by the anomaly monitoring device 50 according to one embodiment is described next.

Figure 2:
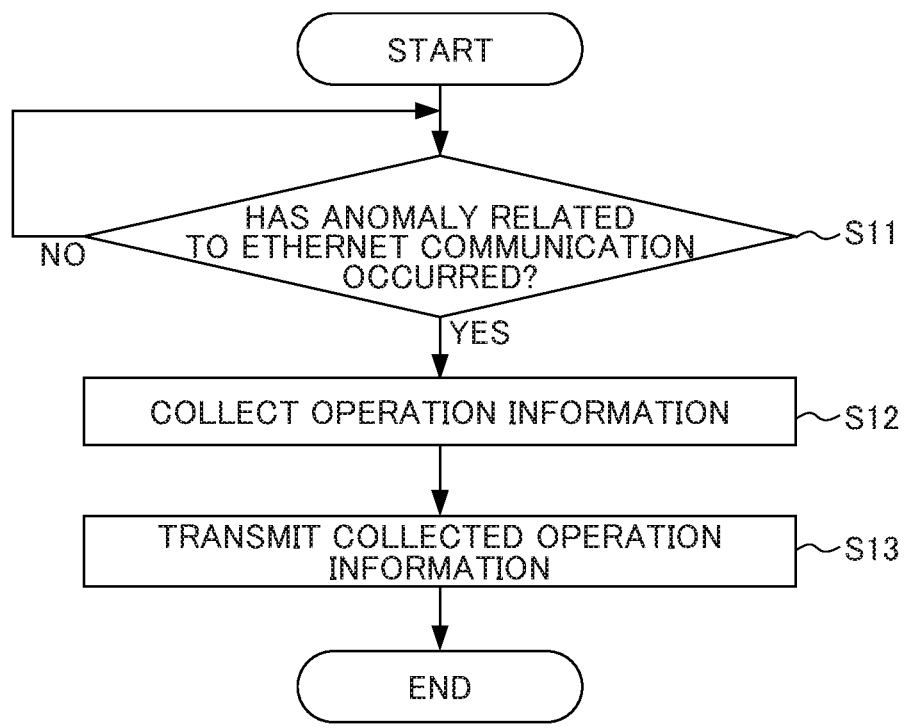
FIG. 2 is a flowchart describing anomaly monitoring processing executed by an anomaly monitoring device shown in FIG. 1.

FIG. 2 is a flowchart describing the anomaly monitoring processing executed by the anomaly monitoring device 50 shown in FIG. 1.

In step S11, the anomaly determination unit 501 determines whether or not an anomaly related to the Ethernet communication has occurred in the robot peripheral device 30 (main computing device 40). In the case where an anomaly related to the Ethernet communication has occurred, the processing proceeds to step S12. On the other hand, in the case where no anomaly related to the Ethernet communication has occurred, the processing remains in step 311, and the anomaly determination unit 501 monitors the operation related to the Ethernet communication in the robot peripheral device 30 periodically at a predetermined time interval.

In step S12, the information collection unit 502 collects the operation information about the operation of the robot peripheral device 30 in response to the determination in step S11 that an anomaly related to the Ethernet communication has occurred.

In step S13, the information transmission unit 503 transmits the operation information collected in step S12, to the robot control device 10 via the Ethernet port 504, by the broadcast communication using the MAC address of the robot peripheral device 30 (main computing device 40).

As described above, the anomaly monitoring device 50 according to one embodiment monitors the operation of the robot peripheral device 30 (main computing device 40) periodically at a predetermined time interval. In the case where an anomaly related to the Ethernet communication has occurred, the anomaly monitoring device 50 collects, as the operation information about the operation of the robot peripheral device 30, the contents output to the register of the CPU 401, the volatile storage medium (DRAM 402), the non-volatile storage medium (HDD 403), and the I/O device 404. In other words, in the case where an anomaly related to the Ethernet communication due to the turning-off of the power supply 406 has occurred, the anomaly monitoring device 50 collects the information indicating the power supply 406 is in an off state, as the operation information of the robot peripheral device 30. In the case where an anomaly related to the Ethernet communication due to the anomalous termination (hang-up) of the communication processing in the CPU 401 has occurred, the anomaly monitoring device 50 collects the contents output to the register of the CPU 401, the volatile storage medium (DRAM 402), the non-volatile storage medium (HDD 403), and the I/O device 404, as the operation information of the robot peripheral device 30. In the case where an anomaly related to the Ethernet communication due to physical disconnection such as breakage of the Ethernet cable or the detachment of the Ethernet cable from the Ethernet port 405 has occurred, the anomaly monitoring device 50 collects the contents output to the register of the CPU 401, the volatile storage medium (DRAM 402), the non-volatile storage medium (HDD 403), and the I/O device 404, indicating that no communication packet has been exchanged over for a predetermined period of time, as the operation information of the robot peripheral device 30.

The anomaly monitoring device 50 then transmits the collected operation information to the robot control device 10, via the Ethernet port 504, by the broadcast communication using the MAC address of the robot peripheral device 30 (main computing device 40).

This allows the robot control device 10 to acquire the operation information in the robot peripheral device 30 (main computing device 40), even if the Ethernet communication has been interrupted between the robot control device 10 and the main computing device 40 of the robot peripheral device 30. Then, the robot control device 10 is able to identify, by analyzing the operation information, the cause of the interruption of the Ethernet communication, from among the causes of the turning-off of the power supply 406, the anomalous termination (hang-up) of the communication processing, and physical disconnection such as breakage of the Ethernet cable or the detachment of the Ethernet cable from the Ethernet port 405.

In other words, the anomaly monitoring device 50 transmits, to the robot control device 10, the operation information about the operation of the robot peripheral device 30 in which an anomaly related to the Ethernet communication has occurred, thereby enabling the prompt investigation of the cause of the interruption of the Ethernet communication. This allows a reduction in the effort and time required for the recovery of the robot system stopped by the interruption of the Ethernet communication.

Further, the robot control device 10 electronically records the acquired operation information of the robot peripheral device 30 (main computing device 40), and the acquired cause of the interruption of the Ethernet communication, thereby enabling the easy and statistical acquisition of, for example, an interruption rate per hour. Then, an operator of the robot system is able to take measures against the interruption of the Ethernet communication on the basis of, for example, the interruption rate per hour.

One embodiment has been described so far. The anomaly monitoring device 50 is not limited to the above-described embodiment. Modifications, improvements and the like are available within the scope wherein the purpose is achieved.

In the above-described embodiment, the anomaly monitoring device 50 is included in the robot peripheral device 30. However, the anomaly monitoring device 50 may be disposed to the robot peripheral device 30, as a separate device from the robot peripheral device 30.

Figure 3:
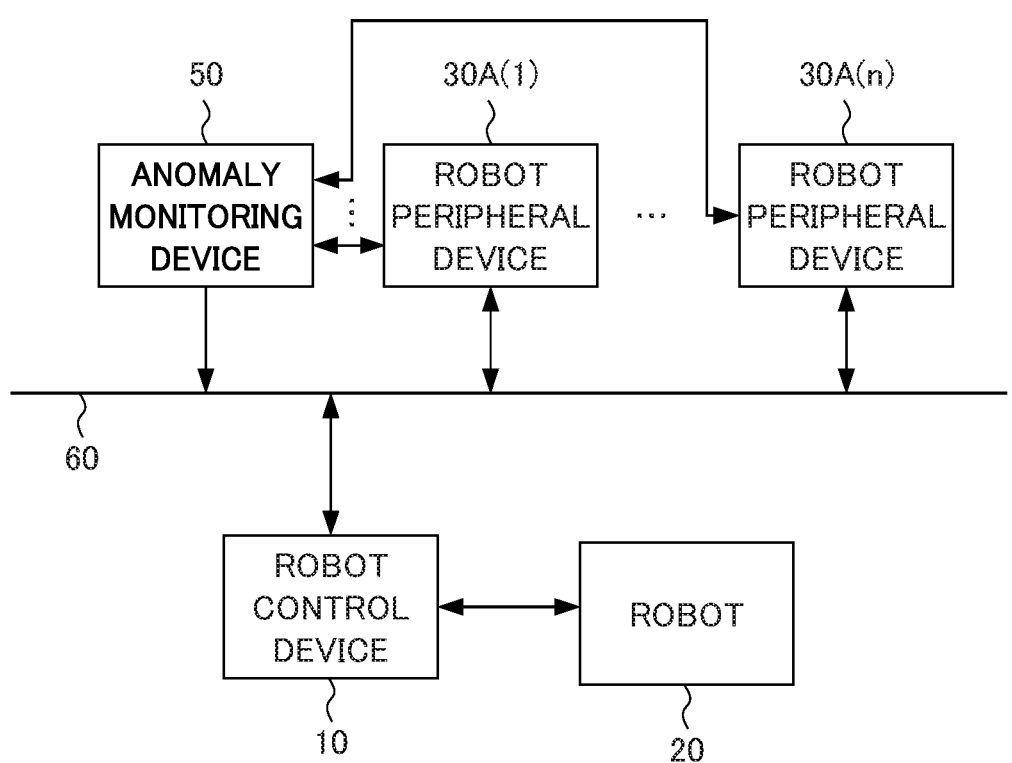
FIG. 3 illustrates one example of a configuration of the robot system.

In this case, in an example as shown in FIG. 3, the anomaly monitoring device 50 may monitor the operation of n pieces of a robot peripheral device 30A (1) to a robot peripheral device 30A (n) controlled by the robot control device 10 (n is an integer of 2 or a greater number). It is noted that the anomaly monitoring device 50 may be directly connected to each of the robot peripheral devices 30A (1) to 30A (n) via a connection interface (not shown) by a wired or wireless connection, as an example.

Then, the anomaly monitoring device 50 may transmit, by broadcast communication, the operation information about the robot peripheral device 30A in which the Ethernet communication has been interrupted, among the robot peripheral devices 30A (1) to 30A (n).

It is noted that each of the robot peripheral devices 30A (1) to 30A (n) corresponds to the robot peripheral device 30 shown in FIG. 1.

It is noted that the respective functions included not only the robot control device 10, but also the main computing device 40 and the anomaly monitoring device 50 included in the robot peripheral device 30 in one embodiment are able to be realized by hardware, software or the combination thereof. Being realized by software herein means being realized at the time when a computer reads and executes a program.

Each of the components included in the anomaly monitoring device 50 is able to be realized by hardware including an electronic circuit and the like, software or the combination thereof. In the case where the components are realized by software, programs included in the software are installed in the computer (anomaly monitoring device 50). These programs may be recorded in a removable medium to be distributed to a user, or may be downloaded to user's computer via a network for distribution. In the case where the components are configured with hardware, some or all of the functions of the respective components included in the above-described devices may be configured with integrated circuits (ICs), for example, ASIC (application specific integrated circuit), gate array, FPGA (field programmable gate array), and CPLD (complex programmable logic device). Specifically, the anomaly determination unit 501 may be a CPU anomaly determination electronic circuit. The information collection unit 502 may be an information collection electronic circuit. The information transmission unit 503 may be an information transmission electronic circuit.

Such programs are able to be stored by the use of various types of non-transitory computer readable media, to be supplied to a computer. The non-transitory computer-readable media include various types of tangible storage media. Examples of the non-transitory computer-readable media include a magnetic recording medium (for example, a flexible disk, magnetic tape, a hard disk drive), a magneto-optical recording medium (for example, a magneto-optical disk), a CD-ROM (read only memory), a CD-R, a CD-R/W, and a semiconductor memory (for example, a mask ROM, PROM, EPROM, flash ROM, RAM). Such programs may be supplied to a computer by various types of transitory computer readable media. Examples of the transitory computer readable media include electrical signal, optical signal, and electromagnetic wave. Such a transitory computer readable medium is capable of supplying a program via a wired communication channel such as wires and optical fibers, or via a wireless communication channel.

It is noted that the steps of describing the program to be recorded in a recording medium include not only the processing to be executed in a time series according to the order of the steps, but also the processing to be executed in parallel or individually, even if not necessarily executed in a time series.

In summary, the anomaly monitoring device according to the present disclosure is able to be realized in various types of embodiments having the following configuration.

(1) The anomaly monitoring device 50 according to the present disclosure includes a power supply 506, an Ethernet port 504, an anomaly determination unit 501 configured to determine whether or not an anomaly related to Ethernet communication has occurred between a peripheral device (robot peripheral device 30) and a control device (robot control device 10), an information collection unit 502 configured to collect operation information about operation of the peripheral device when the anomaly determination unit 501 determines that an anomaly related to the Ethernet communication has occurred, and an information transmission unit 503 configured to transmit the collected operation information outside via the Ethernet port 504, on the basis of the Ethernet communication.

Even when an anomaly related to the Ethernet communication has occurred, the anomaly monitoring device 50 is capable of promptly investigating the cause of the interruption of the Ethernet communication, by transmitting the operation information about the operation of the robot peripheral device 30 to the robot control device 10.

(2) The anomaly monitoring device 50 as described above may include a storage unit 505 configured to store information (MAC address) related to the Ethernet communication, and the information transmission unit 503 may transmit the operation information outside by broadcast communication, on the basis of the information about the Ethernet communication.

This allows the anomaly monitoring device 50 to reliably transmit the operation information about the operation of the robot peripheral device 30 to the robot control device 10.

(3) In the anomaly monitoring device 50 as described above, the operation information about the operation of the peripheral device may indicate a case of the power supply 406 of the peripheral device being in an off state, a case of anomalous termination of communication processing, or a case of physical disconnection of an Ethernet cable.

This allows the anomaly monitoring device 50 to identify the cause of the interruption of the Ethernet communication.

(4) The anomaly monitoring device 50 as described above may be an Ethernet transceiver.

This configuration allows the production of the same effects as in (1) to (3).

(5) The peripheral device 50 as described above may include the anomaly monitoring device 50.

This configuration allows the production of the same effects as in (1) to (4).

(6) In the anomaly monitoring device 50 as described above, the peripheral device may be a robot peripheral device 30, and the control device may be a robot control device 10.

This configuration allows for the avoidance of a robot system including the robot control device 10 and the robot peripheral device 30 from falling into an operation stop state or an anomalous operation state.

(7) In the anomaly monitoring device as described above, the robot peripheral device 30 may be a teaching operation panel.

This configuration allows the production of the same effects as in (6).

EXPLANATION OF REFERENCE NUMERALS

10 ROBOT CONTROL DEVICE
20 ROBOT
30 ROBOT PERIPHERAL DEVICE
40 MAIN COMPUTING DEVICE
50 ANOMALY MONITORING DEVICE
501 ANOMALY DETERMINATION UNIT
502 INFORMATION COLLECTION UNIT
503 INFORMATION TRANSMISSION UNIT
504 ETHERNET PORT
506 POWER SUPPLY

What is claimed is:

1. An anomaly monitoring device comprising:
    a power supply;
    an Ethernet port;
    a non-transitory memory configured to store a program; and
    a hardware processor configured to execute the program and control the anomaly monitoring device to operate as:
    an anomaly determination unit configured to determine, as an anomaly related to Ethernet communication between a robot peripheral device and a robot control device, at least a state in which a power supply of the robot peripheral device is off, a state in which communication processing in a processer of the robot peripheral device has been hung up, or a state of physical disconnection due to breakage of an Ethernet cable or detachment of the Ethernet cable from an Ethernet port, wherein The robot peripheral device includes the anomaly monitoring device;
    an information collection unit configured to collect operation information regarding operations of the robot peripheral device, by using the power supply, at a time of the anomaly and when the anomaly determination unit determines that the anomaly related to the Ethernet communication has occurred; and
    an information transmission unit configured to transmit the collected operation information, by using the power supply, outside of the anomaly monitoring device via the Ethernet port to the robot control device, on the basis of the Ethernet communication.

2. The anomaly monitoring device according to claim 1, wherein the anomaly monitoring device further comprises:
    a storage configured to store information about the Ethernet communication, wherein
    the information transmission unit transmits the operation information outside by broadcast communication, on the basis of the information about the Ethernet communication.

3. The anomaly monitoring device according to claim 1, wherein
    the operation information about the operation of the robot peripheral device indicates a case of the power supply of the robot peripheral device being in an off state, a case of anomalous termination of communication processing, or a case of physical disconnection of an Ethernet cable.

4. The anomaly monitoring device according to claim 1, the anomaly monitoring device being an Ethernet transceiver.

5. The anomaly monitoring device according to claim 1, wherein
    the robot peripheral device is a teaching operation panel.

* * * * *